Patented June 7, 1927.

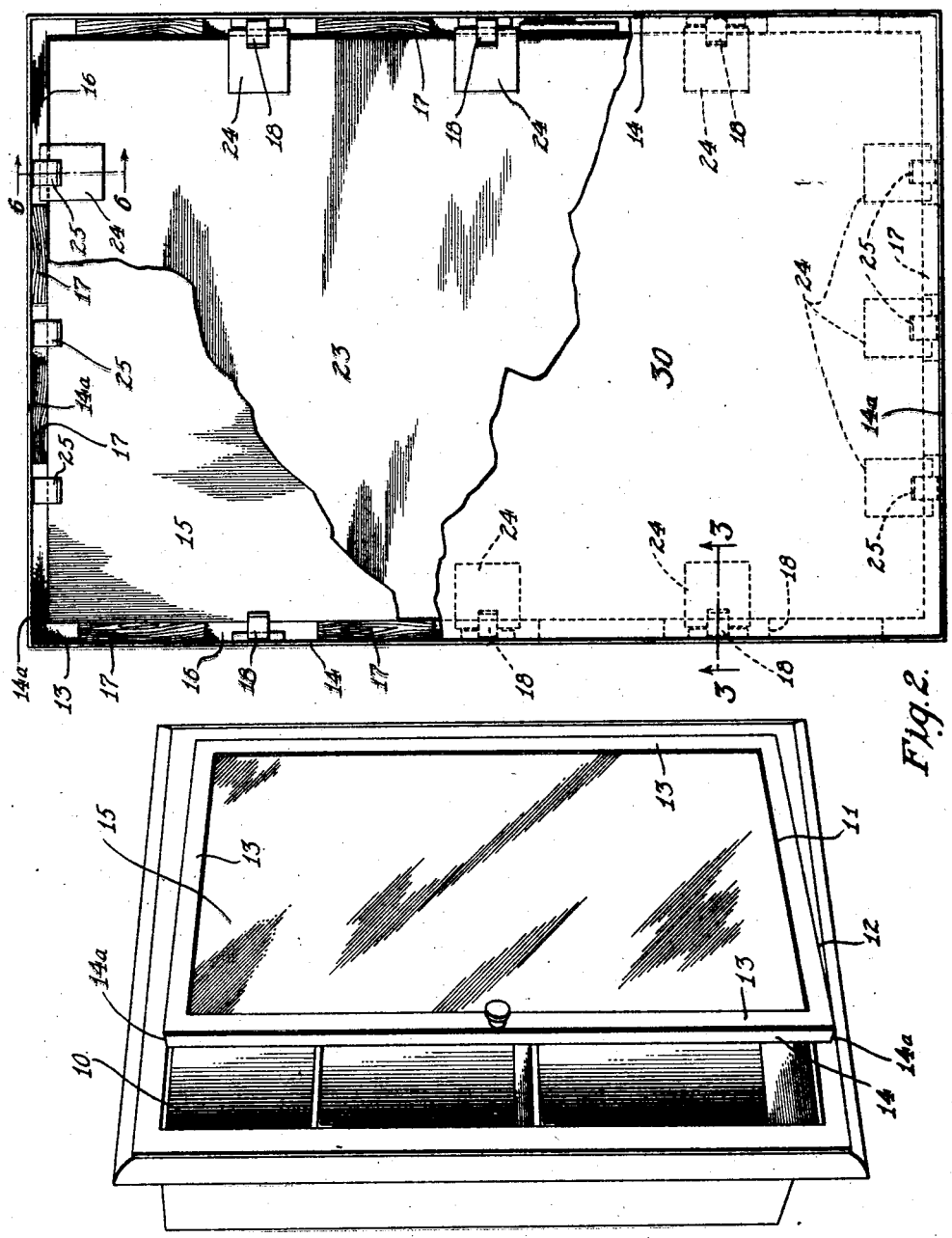

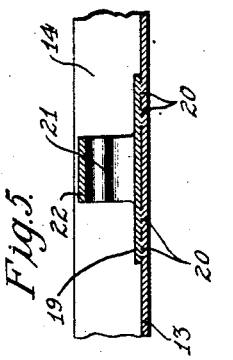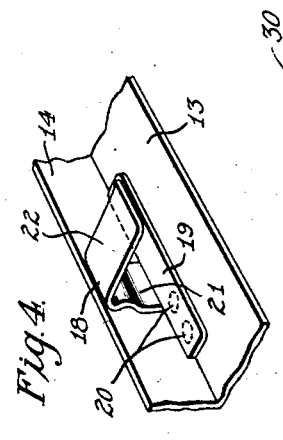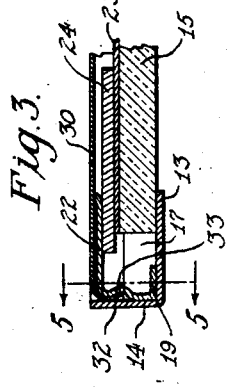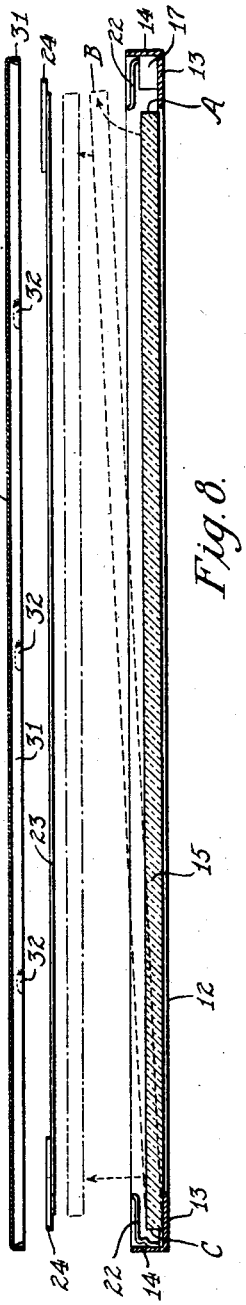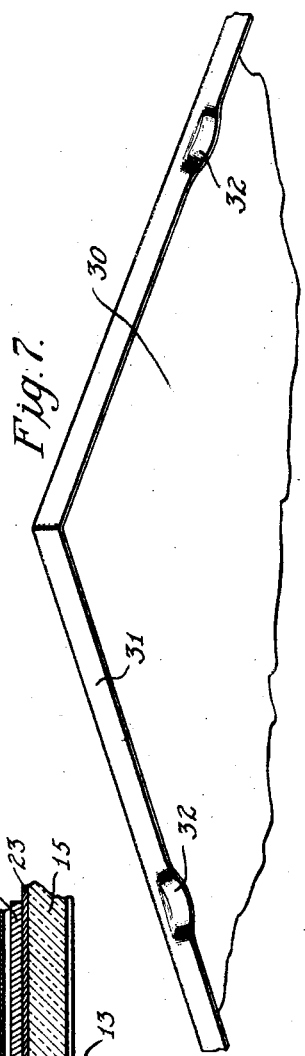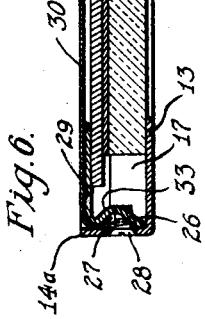

1,631,193

UNITED STATES PATENT OFFICE.

WARNER EUSTIS, OF NEWTON, MASSACHUSETTS.

MIRROR MOUNTING.

Application filed December 21, 1925. Serial No. 76,747.

This invention relates to improvements in mirror mountings or the like and has particular reference to the provision of framed mirrors suitable for use as cabinet doors or for hanging upon walls.

In the re-issue Letters Patent to John P. Eustis, No. 13140 August 2, 1910, there is disclosed a mirror mounting wherein a mirror formed from plate glass is held in a metal frame by means of removable clips. The clips comprise a portion overhanging the back of the glass plate and an off-set portion held by means of flathead counter-sunk screws in the side flanges of the frame. The glass plate is of a smaller area than the frame and suitable spacing blocks are used between the edges of the glass plate and the adjacent edge flanges of the frame to prevent the glass plate from slipping in the frame. While this structure has met with a large measure of commercial success, it has embodied certain undesirable features which the present invention overcomes.

In the prior art structure referred to the fastening elements have been visible from the edge of the frame and from an esthetic standpoint this has not been desirable. Also it has been found that in using such a mirror mounting on a cabinet door wherein the mounting is subject to certain shocks incident to opening and closing of the door, the fastening screws have worked loose with the result that at times the holding clips have become entirely detached from the frame, resulting in possibility of breaking the plate glass.

An important object of the present invention is to provide a mirror mounting including a metal frame which will be free from visible fastening elements on its outer side or vertical edges.

Another object of the invention is to provide such a device from which the mirror can be readily removed or replaced without damage to any of the parts of the mounting.

Another object is to provide such a device with increased mechanical strength coupled with lightness of weight.

Another object is to provide such a device which will be simple in construction, neat in appearance, economical in manufacture and an improvement in the art.

With these and other objects in view, the invention resides in the novel features of construction, combination and arrangement of parts hereinafter set forth, illustrated in the accompanying drawings and specifically pointed out in the appended claims.

Referring to the drawings wherein similar reference characters designate corresponding parts throughout the several views, Figure 1 is a perspective view of a wall cabinet, having a door embodying the invention;

Figure 2 is a rear elevation of the improved mirror mounting with parts broken away;

Figure 3 is a transverse sectional view on the line 3—3 of Figure 2;

Figure 4 is a detailed perspective view of one of the stationary hold-down clips used in my mounting;

Figure 5 is a sectional view on the line 5—5 of Figure 3;

Figure 6 is a sectional view on the line 6—6 of Figure 2;

Figure 7 is a fragmentary perspective view of the backing plate employed in my mounting, and Figure 8 is a sectional view showing parts disassembled and particularly illustrating the method of removing or replacing the glass plate from the frame.

The reference character 10 designates a wall cabinet of any preferred construction and equipped with a door 11 embodying my invention. The door comprises a frame 12 preferably formed from metal and having front flanges 13, side edge flanges 14 and top and bottom edge flanges 14$^a$, disposed at an angle to each other, in which is securely held a plate glass mirror 15. The mirror 15 is of a smaller area than the frame 12, such that a circumferential space 16 separates the edges of the mirror from the adjacent flanges 14 and 14$^a$ of the frame 12, and suitable stay blocks 17, which may be of wood or other desirable material, are disposed at spaced intervals within the circumferential space 16. The stay blocks effectively prevent any lateral movement of the mirror in the frame.

Adjacent the vertical edge flanges 14 of the frame 12, I provide a plurality of spaced stationary hold-down clips designated generally by the reference character 18. These clips may be formed from metal stampings of suitable resiliency and as best shown in Figure 4 they embody a longitudinal base portion 19 secured as by electric spot-welding at 20 to the front flange 13 of the frame.

A leg portion 21 extends upwardly from the outer edge of the base 19 and carries at its upper ends a clamping member 22 which overlies the edge of the mirror a suitable distance to hold the same firmly against the flange 13. A protective sheet 23 of cardboard or the like covers the rear side of the glass plate 15 and may preferably carry reinforcements 24 which are contacted with a proper amount of pressure by the overhanging clamping member 22. The cardboard backing sheet 23 and its reinforcements 24 are sufficiently compressible to prevent the pressure of the clamping member 22 from damaging the glass plate while at the same time the plate will be very firmly held in place. It is to be noted that the amount of the overhang of the clamping members 22 beyond the edges of the glass plate is slightly less than the width of the stay blocks 17 for the purpose of facilitating removal of the glass plate as will be hereinafter described.

By using the stationary hold-down clips, spot-welded to the frame, I eliminate visible fastening elements from the front and vertical edges of the mounting which makes a neater mounting and reduces to a minimum the possibility of the parts working loose. While I have said that the stationary hold-down clips are spot-welded to the flanges 13, they may be permanently secured in some other manner but I prefer the spot-welding because of the limitations of space.

At the upper and lower edges 14ª I provide removable clips 25 similar to those disclosed in the previously issued patent and comprising as best shown in Figure 6 a threaded wall 26 for the reception of a fastening screw 27 having its head 28 disposed in a suitable countersink in the flange 14ª, and an overhanging portion 29 which overlies the upper or lower edge of the mirror 15 similarly to the clamping members 22 of the stationary clips.

In order to give a neat finished appearance to the whole mounting, I provide a backing plate 30 preferably formed of thin sheet tin or aluminum and having forwardly extending flanges 31 disposed about its periphery. The flanges 31 are suitably indented as at 32 in suitable intervals in line with the hold-down clips 18 and 25, said indentations forming detents to engage offset portions 33 in the members 21 and 26. The upper extremities of the members 21 and 26 are sufficiently spaced from the edge flanges 14 and 14ª to permit the passage of the indented portions of the flanges 31 for frictional engagement therebetween.

In the event that it is desired to remove or replace the mirror 15 from the frame, the screws 27 are first removed whereupon the hold-down clips 25 at the upper and lower edges may be taken from the mounting. Thereafter the stay blocks 17 at one of the vertical edges are removed and the glass plate 15 moved over to the position shown in Figure 8 so that its edge A will clear the extremities of the stationary clamping members 22. The edge A is then moved outwardly as shown in dotted lines at B and after it has reached a point beyond the plane of the clamping members 22, the plate may be slid in a reverse direction, to remove its other edge C from the adjacent hold-down clips.

From the foregoing it will be evident that I have provided an improved mirror mounting which will be particularly rugged and of light weight. The outside surface and the vertical edges of the frame will be entirely free from fastening screws or the like and if necessary the glass plate may be removed or replaced. Obviously changes may be made in the details of construction and arrangement of parts and the right is herein reserved to make such changes falling within the scope of the appended claims without departing from the spirit of the invention.

The invention is not restricted to framing mirrors, since it may be used just as advantageously in framing pictures, etchings, engravings, plaques, or other articles which require framing. Therefore, in the description and claims, where I specifically mention "a mirrior" and "glass plate" I imply the equivalents of those terms as well.

Having thus described my invention, what I claim is:

1. In a framed mirror or the like, the combination with a metal frame comprising face and edge flanges arranged substantially at right angles to each other, of a glass plate of less width and length than the frame, removable clips attached to the upper and lower edge flanges to hold the glass plate against the face flange of the frame, additional clips permanently secured to the frame at its vertical edges and having portions extending over the back of the glass plate a distance slightly less than the normal distance between the edges of the glass plate and the adjacent edge flanges of the frame, stay blocks disposed between the edges of the glass plate and the said edge flanges, and a removable backing plate having peripheral flanges in frictional engagement with said clips.

2. In combination with a frame and a glass plate, hold-down clips carried by the frame, said clips having portions extending over the edges of the glass plate and having recessed leg portions adjacent the edges of the glass plate, and a metal backing plate overlying the glass plate and the hold-down clips, said backing plate having detents engageable with the recessed leg portions of the clips to hold it in assembled position.

3. In combination with a frame and a glass plate, hold-down clips carried by the frame, said clips having clamping portions extending over the edges of the glass plate and having recessed leg portions; a sheet of cardboard covering the back of the glass plate and held against said back by the clamping portions of the clips, and a metal backing plate overlying the cardboard and the hold-down clips, said backing plate having means for engaging the recessed leg portions of the clips to hold it in assembled position.

4. In a framed mirror or the like, the combination with a metal frame comprising face and edge flanges arranged substantially at right angles to each other, of a glass plate of less width and length than the frame, a protective sheet of slightly compressible material overlying the back of the glass plate, removable clips attached to the upper and lower edge flanges to hold the protective sheet against the glass and the glass against the face flanges of the frame, additional clips permanently secured by welding to the frame adjacent its vertical edges and having portions extending over the protective sheet a distance slightly less than the normal distance between the edges of the glass plate and the adjacent edge flanges of the frame, stay blocks disposed between the edges of the glass plate and the said edge flanges, and a removable metallic backing plate overlying the protective sheet and the clips, said backing plate having frictional engaging means for holding it in assembled position.

WARNER EUSTIS.